(12) United States Patent
Liu et al.

(10) Patent No.: US 12,143,032 B2
(45) Date of Patent: Nov. 12, 2024

(54) FLYING CAPACITOR-TYPE NPC THREE-LEVEL TOPOLOGY

(71) Applicant: Sungrow Power Supply Co., Ltd., Hefei (CN)

(72) Inventors: Wei Liu, Hefei (CN); Jiacai Zhuang, Hefei (CN); Jun Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 218 days.

(21) Appl. No.: 17/636,161

(22) PCT Filed: May 25, 2020

(86) PCT No.: PCT/CN2020/092056
§ 371 (c)(1),
(2) Date: Feb. 17, 2022

(87) PCT Pub. No.: WO2021/031642
PCT Pub. Date: Feb. 25, 2021

(65) Prior Publication Data
US 2022/0294362 A1    Sep. 15, 2022

(30) Foreign Application Priority Data
Aug. 21, 2019   (CN) .................. 201910773027.7

(51) Int. Cl.
*H02M 7/483*   (2007.01)
*H02M 1/00*    (2006.01)
(Continued)

(52) U.S. Cl.
CPC ....... *H02M 7/4837* (2021.05); *H02M 1/0095* (2021.05); *H02M 1/32* (2013.01); *H02M 7/487* (2013.01)

(58) Field of Classification Search
CPC .................................................. H02M 7/4837
See application file for complete search history.

(56) References Cited

U.S. PATENT DOCUMENTS

| 4,747,036 A | * | 5/1988 | Ichikawa | ................. H02H 7/12 363/54 |
| 10,651,736 B1 | * | 5/2020 | Lazaro | ................ H02M 7/4837 |

(Continued)

FOREIGN PATENT DOCUMENTS

| CN | 1630173 A | 6/2005 |
| CN | 1750374 A | 3/2006 |

(Continued)

OTHER PUBLICATIONS

International Search Report and Written Opinion for International Application No. PCT/CN2020/092056, mailed Aug. 24, 2020.
(Continued)

*Primary Examiner* — Peter M Novak
(74) *Attorney, Agent, or Firm* — Wolf, Greenfield & Sacks, P.C.

(57) ABSTRACT

A flying capacitor-type NPC three-level topology, comprising: two half-busbar capacitors and at least one bridge arm. The bridge arm comprises: a flying capacitor, two inner transistor units, two outer transistor units, and two clamping diodes, wherein the capacitance of the flying capacitor is greater than a specific value. Since the flying capacitor has a clamping effect on the two inner transistor units and the capacitance of the flying capacitor is large, voltage fluctuations of the flying capacitor would not cause overvoltage of switching transistors no matter what type of short circuit fault occurs, thereby preventing the switching transistor units from being damaged due to overvoltage and further improving the security of a circuit.

20 Claims, 10 Drawing Sheets

(51) Int. Cl.
*H02M 1/32* (2007.01)
*H02M 7/487* (2007.01)

(56) References Cited

U.S. PATENT DOCUMENTS

| | | |
|---|---|---|
| 2006/0050537 A1 | 3/2006 | Zeng et al. |
| 2019/0028031 A1 | 1/2019 | Scoones et al. |
| 2021/0028722 A1 | 1/2021 | Jiang et al. |
| 2023/0021124 A1* | 1/2023 | Dong .................. H02M 7/4837 |

FOREIGN PATENT DOCUMENTS

| | | | |
|---|---|---|---|
| CN | 1937380 A | 3/2007 | |
| CN | 101572503 A | 11/2009 | |
| CN | 101860206 A | 10/2010 | |
| CN | 102281006 A | 12/2011 | |
| CN | 102347603 A | 2/2012 | |
| CN | 102624243 A | 8/2012 | |
| CN | 102904217 A | 1/2013 | |
| CN | 102969881 A | 3/2013 | |
| CN | 103457477 A | 12/2013 | |
| CN | 105406747 A | 3/2016 | |
| CN | 205565702 U | 9/2016 | |
| CN | 106487232 A | 3/2017 | |
| CN | 106505866 A | 3/2017 | |
| CN | 107592003 A | 1/2018 | |
| CN | 107707126 A | 2/2018 | |
| CN | 207910685 U | 9/2018 | |
| CN | 108667327 A | 10/2018 | |
| CN | 208174539 U | 11/2018 | |
| CN | 109474197 A | 3/2019 | |
| CN | 110474550 A | 11/2019 | |
| EP | 3 174 190 A1 | 5/2017 | |
| EP | 3 343 749 A1 | 7/2018 | |
| EP | 3105852 B1 * | 12/2020 | ............. H02M 3/07 |
| JP | 2002-223573 A | 8/2002 | |
| JP | 2016-226223 A | 12/2016 | |
| JP | 2018-530306 A | 10/2018 | |
| WO | WO 2013/005498 A1 | 10/2013 | |

OTHER PUBLICATIONS

Zhang et al., Zero-voltage-switching PWM full-bridge three-level converter. Proceeding of the CSEE. 2005;25(16):17-22.

Extended European Search Report for European Application No. 20854621.8, dated Jul. 13, 2023.

Wang et al., A new six-switch five-level active neutral point clamped inverter for PV applications. IEEE Transactions on Power Electronics. Nov. 1, 2016;32(9):6700-15.

First Office Action for Japanese Application No. 2022-511070, mailed Nov. 16, 2022.

* cited by examiner

FLYING CAPACITOR-TYPE NPC THREE-LEVEL TOPOLOGY

This application is a national stage filing under 35 U.S.C. § 371 of International Patent Application Serial No. PCT/CN2020/092056, filed May 25, 2020, which claims priority to Chinese Patent Application No. 201910773027.7, entitled "FLYING CAPACITOR-TYPE NPC THREE-LEVEL TOPOLOGY", filed on Aug. 21, 2019 with the China National Intellectual Property Administration. The contents of these applications are incorporated herein by reference in their entirety.

FIELD

The present disclosure relates to the technical field of short circuit protection, and in particular, to a NPC three-level topology with a flying capacitor.

BACKGROUND

At present, voltage stress of each switch in the three-level topology is only half of the input voltage. Further, harmonic components can be effectively reduced and output waveform quality is improved in the three-level topology. Therefore, the three-level topology is widely used in the fields requiring the high input voltage such as renewable energy and rail.

The NPC (Neutral Point Clamp) three-level topology is the most classic and has the widest range of use. Referring to FIG. 1, the NPC three-level bridge arm includes four reverse-conducting switches and two clamping diodes. Switches S1 and S4 are outer switches, and switches S2 and S3 are inner switches. The reverse-conducting switch may be a MOSFET or an IGBT with an anti-parallel diode. Capacitors Cd1 and Cd2 are connected in series to divide the input voltage Vin into two equal parts. Switches S1 and S4 are clamped to both ends of the capacitors Cd1 and Cd2 by the clamping diodes Dc1 and Dc2 respectively, so that the voltage across each of the outer switches S1 and S4 does not exceed Vin/2. The NPC three-level topology has no clamping effect on the inner switches S2 and S3. The voltage across the inner switches not exceeding Vin/2 is ensured by the switching pattern that the outer switches lags behind the inner switch's turn-on and leads the inner switch's turn-off.

However, when the NPC three-level topology is short-circuited, the switching pattern in normal operation is destroyed. Since the NPC three-level topology has no clamping effect on the inner switch, the inner switch may be damaged due to overvoltage, resulting in damage to an entire bridge arm and even the entire circuit. The NPC three-level topology cannot effectively protect against all short circuit conditions. Further, the inner switch fails to be switched off immediately after being short-circuited, which increases the possibility of damage to the switch, resulting in low safety of the circuit.

SUMMARY

In view of this, a NPC three-level topology with a flying capacitor is provided according to the present disclosure, to reduce the possibility of damage to switches due to overvoltage, thereby improving safety of the circuit.

A NPC three-level topology with a flying capacitor is provided according to the present disclosure. The NPC three-level topology with the flying capacitor includes two half-bus capacitors and at least one bridge arm. The at least one bridge arm includes a flying capacitor, two inner switch units, two outer switch units and two clamping diodes. Capacitance of the flying capacitor is greater than or equal to a preset value. The two half-bus capacitors are identical. The two clamping diodes are identical.

In an embodiment, the two half-bus capacitors are connected in series. The two clamping diodes are connected in series. A connection point of the two half-bus capacitors is connected to a connection point of the two clamping diodes. One terminal of the two half-bus capacitors that are connected in series is configured to be a positive electrode of a direct current side of the NPC three-level topology with the flying capacitor, and is connected to one terminal of one of the two inner switch units, one terminal of the flying capacitor, and a cathode of the two clamping diodes that are connected in series via one of the two outer switch units in the bridge arm. The other terminal of the two half-bus capacitors that are connected in series is configured to be a negative electrode of the direct current side of the NPC three-level topology with the flying capacitor, and is connected to one terminal of the other of the two inner switch units, the other terminal of the flying capacitor, and an anode of the two clamping diodes that are connected in series via the other of the two outer switch units in the bridge arm. A connection point of the two inner switch units is configured to be a port of an alternating current side of the NPC three-level topology with the flying capacitor.

In an embodiment, the preset value is calculated from an expression:

$$Isc*Tsc/(Kprt*V(BR)DSS-Vin\_max/2);$$

where Isc represents an average short circuit current during a short circuit interval, Tsc represents duration time of the short circuit. V(BR)DSS represents the breakdown voltage of a switch in a switch unit, Vin_max represents a maximum input voltage, and Kprt represents an insurance coefficient.

In an embodiment, the two inner switch units and the two outer switch units each include a short circuit detection unit, a control switch, an isolation driving unit, and a switch. The short circuit detection unit is configured to generate, when the switch is detected to be short-circuited, a fault signal and send the fault signal to the control switch. The control switch is configured to: control the switch to switch off when receiving the fault signal sent by the short circuit detection unit; and output a corresponding driving signal to the isolation driving unit when receiving a driving signal for disabling or enabling from a micro-control unit (MCU) of the NPC three-level topology with the flying capacitor. The isolation driving unit is configured to control, in response to the corresponding driving signal, the switch to switch off or on.

In an embodiment, the short circuit detection unit is further configured to send, when the switch is detected to be short-circuited, the fault signal to the MCU, where the MCU is configured to output a driving signal for disabling to each control switch, to switch off the switch corresponding to the control switch via the isolation driving unit corresponding to the control switch.

In an embodiment, the NPC three-level topology with the flying capacitor further includes a fault action unit. The short circuit detection unit is further configured to send, when the switch is detected to be short-circuited, the fault signal to the fault action unit, where the fault action unit is configured to output a driving signal for disabling to each control switch, to switch off the switch corresponding to the control switch via the isolation driving unit corresponding the control switch.

In an embodiment, the fault action unit is further configured to send the fault signal to the MCU.

In an embodiment, the NPC three-level topology with the flying capacitor further includes a voltage management circuit. The voltage management circuit is configured to charge the flying capacitor after the NPC three-level topology with the flying capacitor is powered on.

In an embodiment, the voltage management circuit includes a charging branch and a charging driving unit. The charging driving unit is configured to control, in a case that a MCL of the NPC three-level topology with the flying capacitor meets a preset condition, the charging branch to charge the flying capacitor. One terminal of the charging branch is connected to the flying capacitor, and the other terminal of the charging branch is connected to a positive electrode or a negative electrode of a direct current side of the NPC three-level topology with the flying capacitor.

In an embodiment, the preset condition is that a present time instant is within a preset time period since a time instant when the NPC three-level topology with the flying capacitor is powered on. The preset time period is greater than three times a time constant of the charging branch.

In an embodiment, the voltage management circuit further includes a sampling unit. The sampling unit is configured to sample a voltage across the flying capacitor, and send the sampled voltage to the MCU. The preset condition is that: the voltage across the flying capacitor Css is not within an interval of $[(1-k)Vin/2, (1+k)Vin/2]$, or the voltage across the flying capacitor Css is less than or equal to $(1-k)Vin/2$, where Vin represents the input voltage of the direct current side of the NPC three-level topology with the flying capacitor, and k represents a startup factor of the voltage across the flying capacitor.

In an embodiment, the charging branch includes a resistor and a controllable switch. The resistor is connected in series to the controllable switch. A control terminal of the controllable switch is connected to an output terminal of the charging driving unit.

In an embodiment, the number of the bridge arm in the NPC three-level topology with the flying capacitor is an even number. In half of the bridge arms, the charging branch is arranged between the positive electrode of the direct current side of the NPC three-level topology with the flying capacitor and a flying capacitor in the bridge arm. In the other half one of the bridge arms, the charging branch is arranged between the negative electrode of the direct current side of the NPC three-level topology with the flying capacitor and a flying capacitor in the bridge arm.

In an embodiment, one of the two outer switch units is constantly on during the off phase in a hiccup mode.

It can be known from the above technical solutions that the NPC three-level topology with the flying capacitor according to the present disclosure includes two half-bus capacitors and at least one bridge arm. Each of the bridge arm includes a flying capacitor, two inner switch units, two outer switch units, and two clamping diodes. The flying capacitor has capacitance greater than a preset value. Since the flying capacitor clamps the two inner switch units and has a large capacitance, the voltage change across the flying capacitor does not cause overvoltage of a switch transistor no matter what kind of short circuit fault occurs, thereby avoiding damage to the switch transistor unit due to overvoltage, and further improving the safety of the circuit.

DETAILED DESCRIPTION OF EMBODIMENTS

Technical solutions in embodiments of the present disclosure are described clearly and completely below in conjunction with the drawings in the embodiments of the present disclosure, so that objectives, technical solutions, and advantages of the embodiments of the present disclosure become clearer. It is apparent that the described embodiments are some rather than all of the embodiments of the present disclosure. Based on the embodiments of the present of the present disclosure, all other embodiments obtained by those of skilled in the art without any creative work fall within the protection scope of the present disclosure.

Terms of "include", "comprise" or any other variants herein are intended to be non-exclusive. Therefore, a process, method, article or device including a series of elements includes not only these elements but also other elements that are not enumerated, or also includes the elements inherent for the process, method, article or device. Unless expressively, limited otherwise, the statement "comprising (including) one . . . " does not exclude the case that the process, method, article or device includes another similar element.

A NPC three-level topology with a flying capacitor is provided according to an embodiment of the present disclosure, so as to solve the problem of low safety of the circuit due to failure to effectively protect against all short circuit conditions and a strong possibility of damage to a switch resulted from failure to switch off an inner switch immediately after being short-circuited.

Figure 1:
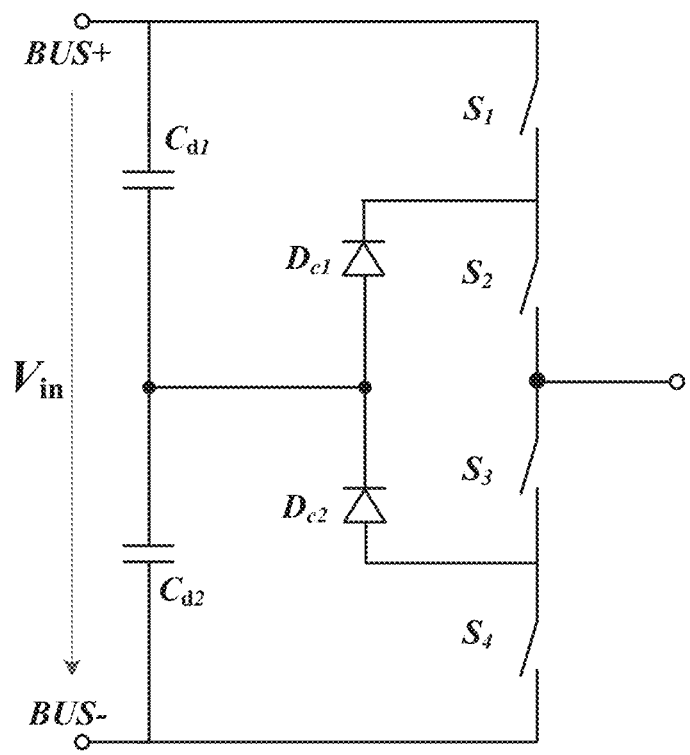
FIG. 1 is a schematic diagram of a NPC three-level topology according to the conventional technology.
Figure 2:
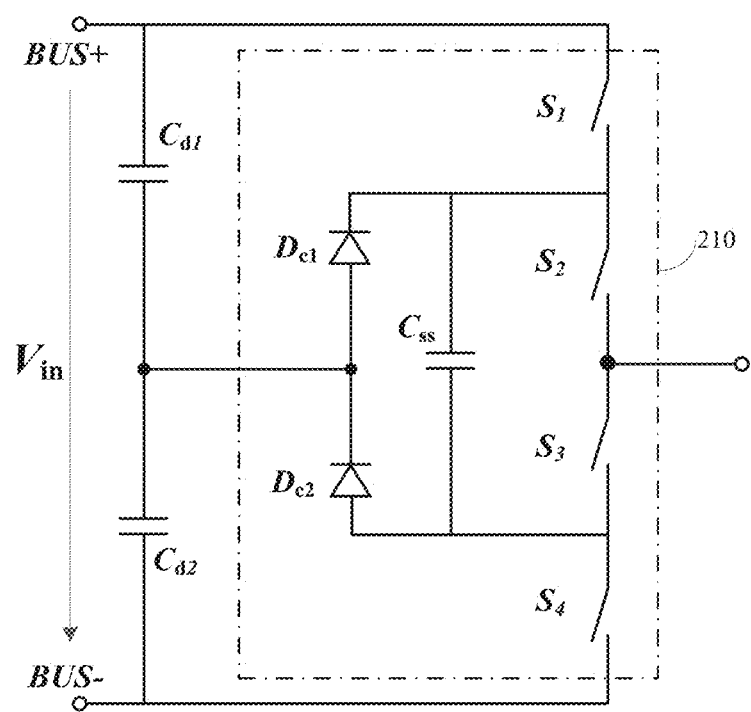
FIG. 2 is a schematic diagram of a NPC three-level topology with a flying capacitor according to an embodiment of the present disclosure.

Referring to FIG. 2, the NPC three-level topology with the flying capacitor includes two half-bus capacitors (that is, the first capacitor Cd1 and the second capacitor Cd2) and at least one bridge arm 210. The bridge arm 210 includes two clamping diodes (that is, the first diode Dc1 and the second diode Dc2), two outer switch units (that is, the first switch unit S1 and the fourth switch unit S4), two inner switch units (that is, the second switch unit S2 and the third switch unit S3) and a flying capacitor Css.

One terminal of the first capacitor Cd1 is connected to one terminal of the first switch unit S1, and a node at which the first capacitor Cd1 is connected to the first switch unit S1 is configured to be a positive electrode of a direct current side of the NPC three-level topology with the flying capacitor. The other terminal of the first capacitor Cd1 is connected to one terminal of the second capacitor Cd2, an anode of the first diode Dc1, and a cathode of the second diode Dc2.

The other terminal of the second capacitor Cd2 is connected to one terminal of the fourth switch unit S4 and a node at which the second capacitor Cd2 is connected to the fourth switch unit S4 is configured to be a negative electrode of the direct current side of the NPC three-level topology with the flying capacitor. Therefore, an input voltage of the direct current side is divided into two equal parts by the first capacitor Cd1 and the second capacitor Cd2. Each voltage across of the first capacitor Cd1 and the second capacitor Cd2 is half of the input voltage of the direct current side.

One terminal of the flying capacitor Css is connected to a cathode of the first diode Dc1, the other terminal of the first switch unit S1, and one terminal of the second switch unit S2. The other terminal of the flying capacitor Css is connected to an anode of the second diode Dc2, the other terminal of the fourth switch unit S4, and one terminal of the third switch unit S3. Therefore, the flying capacitor Css clamps each voltage across of the second switch unit S2 and the third switch unit S3 to half of an output voltage of the direct current side.

Therefore, it is unnecessary to switch off an outer switch unit before an inner switch unit. When the second switch unit S2 is detected to be short-circuited, the second switch unit S2 is switched off immediately without waiting for the first switch unit S1 to be switched off. The first switch unit S1 and the fourth switch unit S4 each is configured to be an outer switch unit, and the second switch unit S2 and the third switch unit S3 each is configured to be an inner switch unit.

The other terminal of the second switch unit S2 is connected to the other terminal of the third switch unit S3, and a node at which the second switch unit S2 is connected to the third switch unit S3 is configured to be a port of an alternating current side of the NPC three-level topology with the flying capacitor.

Capacitance of the flying capacitor Css is greater than or equal to a preset value. The first capacitor Cd1 is identical to the second capacitor Cd2. The first diode Dc1 is identical to the second diode Dc2. The first switch unit S1, the second switch unit S2, the third switch unit S3 and the fourth switch unit S4 are identical.

The capacitance of the flying capacitor Css is greater than a preset value, so that the voltage across the flying capacitor Css does not exceed the breakdown voltage of the inner switch unit in a case that an outer switch unit is short-circuited, and the difference between the input voltage of the direct current side and the voltage across the flying capacitor Css does not exceed the breakdown voltage of the outer switch unit in a case that an inner switch unit is short-circuited.

In practice, the above preset value may be calculated from an expression:

$$Isc*Tsc/(k*V(BR)DSS-Vin\_max/2).$$

where Isc represents the average short circuit current during a short circuit interval, Tsc represents duration time of the short circuit, V(BR)DSS represents the breakdown voltage of the switch in the switch unit, Vin_max represents the maximum input voltage, and k represents the insurance coefficient.

Alternatively, the preset value is greater than a value calculated from the expression Isc*Isc/(k*V(BR)DSS−Vin_max/2), depending on actual use scenario of the NPC three-level topology with a flying capacitor, which is all within the protection scope of present disclosure.

The duration of short circuit refers to a time period from a time instant when the short circuit starts to a time instant when the short circuit is removed successfully, and is calculated based on a current flowing through a switch. Before the short circuit, the current flowing through the switch is equal to zero or a normal operation current. Since the short circuit starts, the current flowing through the switch increases sharply. The short circuit is detected by a short circuit detection unit, so that the switch is switched off, and the current flowing through the switch decreases to zero. Therefore, the duration of short circuit may refer to a time period from a time instant when the current flowing through the switch starts to increase sharply to a time instant when the current-flowing through the switch decrease to zero. The duration of short circuit is related to reaction speeds of the short circuit detection unit, the fault action unit, the isolation driving unit, and need to be determined depending on actual situations.

In order to prevent the switch from being damaged due to short circuit, in a case that the switch is a Metal-Oxide-Semiconductor Field-effect Transistor (MOSFET), the duration of short circuit is less than 3 μs. In a case that the switch is an Insulated Gate Bipolar Transistor (IG-BT), the duration of short circuit is less than 10 μs.

Isc represents the average current flowing through the switch during the short circuit interval, and approximates to an average current flowing through the flying capacitor Css. Therefore, the average current flowing through the switch is determined as the average current flowing through the flying capacitor Css.

The preset value is calculated from the expression Isc*Tsc/(k*V(BR)DSS−Vin_max/2) as follows.

In a case of a short circuit, a voltage across the flying capacitor Css is calculated form the following expression (1):

$$\Delta U = Isc*Tsc/Cs, \qquad (1)$$

where ΔU represents an amount of change in the voltage across the flying capacitor Css, and Cs represents the capacitance of the flying capacitor Css.

In order to prevent the switch in the switch unit from being damaged due to overvoltage, ΔU is less than or equal to k*V(BR)DSS−Vin_max/2, as shown in the following expression:

$$\Delta U <= k*V(CR)DSS - Vin\_max/2, \qquad (2)$$

where V(BR)DSS represents the breakdown voltage of the switch in the switch unit, and k is generally ranges from 70% to 90%.

The expression of Cs>=Isc*Tsc/(k*V(BR)DSS−Vin_max/2) is obtained by combining the expressions (1) and (2). Therefore, the preset value is expressed as Isc*Tsc/(k*V(BR)DSS−Vin_max/2).

It should be noted that due to parasitic inductance, a maximum voltage across the switch unit when the switch unit is off is greater than the voltage across the flying capacitor Css. Therefore, the capacitance of the flying capacitor Css includes a certain margin to ensure that the switch is not be damaged due to overvoltage.

In this embodiment, the first switch unit S1 and the fourth switch unit S4 each is configured to be an outer switch unit, and the second switch unit S2 and the third switch unit S3 each is configured to be an inner switch unit. Herein, in a case that a short circuit occurs due to a fault in the outer switch unit and/or the inner switch unit, the protection performed by the three-level flying capacitor topology is illustrated in detail as follows.

In a case that the short circuit is resulted from a fault in any one switch unit as the inner switch unit, the flying capacitor Css is charged or discharges, and the diode performs clamping, so as to prevent a switch unit from being damaged due to overvoltage. For example, during a time period in which the first switch unit S1 and the second switch unit S2 both are switched on, the third switch unit S3 is falsely switched on due to interference on a driving signal of the third switch unit S3, resulting in a short circuit of the NPC three-level topology with the flying capacitor. In this case, the flying capacitor Css is short-circuited by the second switch unit S2 and the third switch unit S3, the flying capacitor Css discharges through the second switch unit S2 and the third switch unit S3. The voltage across the flying capacitor Css decreases.

In this case, the second diode Dc2 clamps the voltage across the fourth switch unit S4 to both ends of the second capacitor Cd2. That is, the voltage across the fourth switch unit S4 is equal to half of the input voltage of the direct current side. Therefore, the voltage across the fourth switch unit S4 is not enough to break down the fourth switch unit S4.

In a case that the short circuit is resulted from a fault in any one switch unit as the outer switch unit, the flying capacitor Css is charged or discharges, so as to prevent a switch unit from being damaged due to overvoltage. For example, during a time period in which the first switch unit S1 and the second switch unit S2 both are switched on, the fourth switch unit S4 is falsely switched on due to interference on a driving signal of the fourth switch unit S4, resulting in a short circuit of the NFC three-level topology with the flying capacitor. In this case, the flying capacitor Css is short-circuited to the positive and negative electrodes of the direct current side by the first switch unit S1 and the fourth switch unit S4. The flying capacitor Css is charged, that is, the voltage across the flying capacitor Css increases. The voltage across the third switch unit S3 is equal to the voltage across the flying capacitor, and the capacitance of the flying capacitor is greater than the preset value, so that the voltage across the flying capacitor does not exceed the breakdown voltage of the switch.

With the flying capacitor Css, not only the voltage across the inner switch unit is clamped to half of the input voltage in a case that the topology operates normally, but also the inner switch unit is prevented from being damaged due to overvoltage in a case that a short circuit occurs in the topology. Further, a voltage across the first capacitor Cd1 and a voltage across the second capacitor Cd2 are balanced, a switching loop of the inner switch unit is simplified, and a voltage peak when the inner switch unit is switched off is reduced.

It should be noted that in a case that the first switch unit S1, the second switch unit S2, the third switch unit S3, and the fourth switch unit S4 are all operate normally, the voltage across the flying capacitor Css is half of the input voltage of the direct current side.

It should further be noted that the voltage across the flying capacitor Css changes as a switch unit is short-circuited. Therefore, whether a short circuit occurs in the NPC three-level topology with the flying capacitor is determined by detecting the voltage across the flying capacitor Css. In a case that the voltage across the flying capacitor Css is not within a preset range, the NPC three-level topology with the flying capacitor is determined as having a short circuit.

In this embodiment, the short circuit includes five types depending on the switch units participating in the short circuit, and the five types are classified into three categories including an inner switch short circuit, an outer switch short circuit, and a bridge arm short circuit, as shown in Table 1.

TABLE 1

Correspondence between types and categories of short circuit

| Types | Switch units participating in short circuit | Categories |
| --- | --- | --- |
| 1 | S1, S2, S3 | Inner switch short circuit |
| 2 | S2, S3, S4 | |
| 3 | S1, S2, S4 | Outer switch short circuit |
| 4 | S1, S3, S4 | |
| 5 | S1, S2, S3, S4 | Bridge arm short circuit |

In a case of inner switch short circuit, the flying capacitor Css discharges via the second switch unit S2 and the third switch unit S3. In a case of outer switch short circuit, an input power supply of the direct current side charges the flying capacitor Css via the first switch unit S1 and the fourth switch unit S4. In a case of bridge arm short circuit, the flying capacitor Css has both a charging circuit and a discharging circuit. It is uncertain whether the voltage across the flying capacitor Css increases or decreases. However, it is certain that the voltage across the flying capacitor Css in the case of bridge arm short circuit is lower than the voltage in the case of outer switch short circuit and higher than the voltage in the case of inner switch short circuit.

Since the capacitance of the flying capacitor Css is greater than the preset value, no switch unit is damaged due to overvoltage resulted from a change in the voltage across the flying capacitor Css in the case of inner switch short circuit, outer switch short circuit, or bridge arm short circuit. Moreover, the voltage across the flying capacitor Css acts as a clamping voltage of the inner switch. Therefore, in the case of inner switch short circuit, outer switch short circuit, and bridge arm short circuit, the faulty switch unit is immediately switched off, without switching off the outer switch unit before the inner switch unit.

It should be noted that the foregoing is illustrated with a NPC three-level topology as an example, and a flying capacitor Css is added to the NPC three-level topology. In practice, a flying capacitor Css may be added to an ANPC three-level topology, having the same process and principle as the above NPC three-level topology with the flying capacitor. Therefore, a NPC three-level topology with a flying capacitor formed by adding a flying capacitor Css to the ANPC three-level topology and its operation and principle are also within the protection scope of the present disclosure.

In this embodiment, the flying capacitor Css has a clamping effect on the second switch unit S2 and the third switch unit S3, and the capacitance of the flying capacitor Css is greater than the preset value. Therefore, no switch unit is damaged due to overvoltage resulted from the voltage across the flying capacitor Css. Furthermore, in a case that one of the second switch unit S2 and the third switch unit S3 is short-circuited, none of the second switch unit S2 and the third switch unit S3 is broken down due to overvoltage, so as to prevent the switch unit from being damaged due to overvoltage, thereby improving safety of the circuit.

Figure 3:
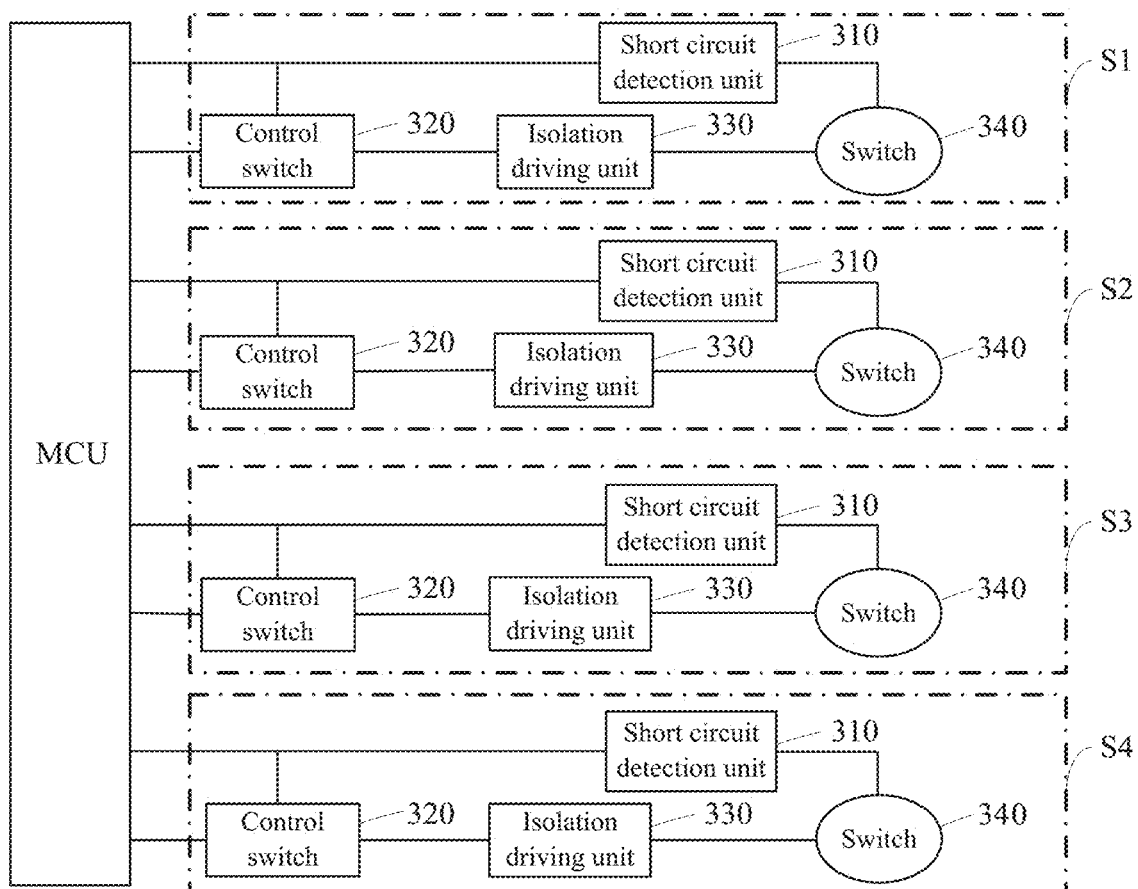
FIG. 3 is a schematic diagram of a switch transistor unit in it NPC three-level topology with a flying capacitor according to an embodiment of the present disclosure.

In an embodiment, each of the first switch unit S1, the second switch unit S2, the third switch unit S3, and the fourth switch unit S4 in the above embodiment of the present disclosure shown in FIG. 2 includes a short circuit detection unit 310, a control switch 320, an isolation driving unit 330 and a switch 340, as shown in FIG. 3.

The short circuit detection unit 310 is configured to generate a fault signal when the switch 340 is detected to be short-circuited and send the fault signal to the control switch 320.

The control switch 320 is configured to control the switch 340 to switch off when receiving the fault signal sent by the short circuit detection unit 310, and output a corresponding driving signal to the isolation driving unit 330 when receiving a driving signal for disabling or enabling from a microcontrol unit (MCU) of the NPC three-level topology with the flying capacitor.

The isolation driving unit 330 is configured to control, in response to the corresponding driving signal, the switch 340 to switch off or on.

When detecting that the switch 340 is short-circuited, the short circuit detection unit 310 generates the fault signal and sends the fault signal to a control terminal of the control switch 320. When the control terminal of the control switch 320 receives the fault signal, the control switch 320 controls the switch 340 to switch off.

Further, when receiving the driving signal for disabling or enabling from the MCU of the NPC three-level topology with the flying capacitor, the control switch 320 outputs the corresponding driving signal to the isolation driving unit 330. The isolation driving unit 330 controls, when receiving the driving signal, the switch 340 to switch off or on.

It should be noted that when receiving the corresponding driving signal, the isolation driving unit 330 first performs isolation amplification on the driving signal, and then drives the switch 340 in response to the corresponding driving signal. For example, when receiving a driving signal for disabling, the isolation driving unit 330 first performs isolation amplification on the driving signal for disabling, and then controls the switch 340 to switch off. When receiving a driving signal for enabling, the isolation driving unit 330 first performs isolation amplification on the driving signal for enabling, and then controls the switch 340 to switch on.

In practice, the short circuit detection unit 310 determines whether the switch 340 is short-circuited by detecting a current flowing through the switch 340.

In a case of short circuit, the current in a short-circuited loop is much greater than a current in normal operation. In this case, the short circuit detection unit 310 determines that the switch 340 is short-circuited when detecting that the current flowing through the switch 340 is greater than a threshold, and then generates a fault signal and sends the fault signal.

In this embodiment, a time period of hardware control is shorter than a time period of software control. Therefore, a time period from a time instant when the short circuit detection unit 310 detects a short circuit to a time instant when the control switch 320 outputs the driving signal for disabling to the isolation driving unit 330 and then to a time instant when the switch 340 is switched off is relatively short. Correspondingly, a time period from a time instant when the switch 340 is short-circuited to a time instant when the switch 340 is switched off is relatively short, avoiding a delay due to transfer and logic determination, and having a fast protection respond, thereby reducing the possibility of damage to the short-circuited switch 340 due to overcurrent.

In practice, the short circuit detection unit 310 as shown in FIG. 3 is further configured to send, when detecting that the switch 340 is short-circuited, the fault signal to the MCU. The MCU outputs, for each of the first switch unit S1, the second switch unit S2, the third switch unit S3, and the fourth switch unit S4, a driving signal for disabling to the control switch 320 in the switch unit, so that the switch 340 in the switch unit is switched off by the isolation driving unit 330 in the switch unit.

When detecting that the switch 340 is faulty, the short circuit detection unit 310 generates a fault signal and sends the fault signal to the control switch 320 and the MCU. When receiving the fault signal sent by the short circuit detection unit 310, the control switch 320 controls the switch 340 to switch off.

When receiving the fault signal sent by the short circuit detection unit 310, the MCU outputs, for each of the first switch unit S1, the second switch unit S2, the third switch unit S3, and the fourth switch unit S4, a driving signal for disabling to the control switch 320 in the switch unit. When receiving the driving signal for disabling, the control switch 320 outputs a driving signal for disabling to the isolation driving unit 330 in the same switch unit as the control switch 320, thereby switching off the switch 340 in the same switch unit as the control switch 320 by the isolation driving unit 330.

It should be noted that if a control switch 320 in a switch unit that is currently faulty is off, that is, an input terminal of the control switch 320 is disconnected from an output terminal of the control switch 320, the control switch 320 fails to output a driving signal. In this case, the switch 340 in the first switch unit S1 is already off Therefore, switching off the switch 340 is not affected.

For example, the switch 340 in the first switch unit S1 is short-circuited. When detecting that the switch 340 is short-circuited, the short circuit detection unit 310 in the first switch unit S1 generates a fault signal and outputs the fault signal to the control switch 320 in the first switch unit S1 and the MCU. In this case, the control switch 320 controls the switch 340 in the first switch unit S1 to switch off.

Further, when receiving the fault signal, the MCU sends a driving signal for disabling to a control switch 320 in each switch unit (that is, S1, S2, S3, and S4). When receiving the driving signal for disabling, the control switch 320 outputs a driving signal for disabling to the isolation driving unit 330 in the same switch unit as the control switch 320, and the isolation driving unit 330 controls the switch 340 in the same switch unit as the isolation driving unit 330 to switch off if the control switch 320 in the first switch unit S1 is off, the isolation driving unit 330 in the first switch unit S1 fails to receive the driving signal for disabling.

It should be noted that all the switch units each may detect that the switch 340 in the switch unit is short-circuited. In this case, a short circuit detection unit 310 that first detects a short circuit sends a fault signal to the MCU.

The switch 340 in each switch unit has two fault action approaches. One fault action approach is that the short circuit detection unit 310 in the same switch unit as the switch 340 directly switch off the switch when detecting a short circuit. The other fault action approach is that the MCU switches off all the switches when receiving a fault signal sent by the short circuit detection unit 310 that first detects a short circuit.

A time instant when removing the fault is determined by the short circuit detection unit 310 that first detects a short circuit. For example, the first switch unit S1, the second switch unit S2, the third switch unit S3, and the fourth switch unit S4 are all participate in a short circuit (for example, the bridge arm short circuit). It is assumed that the short circuit detection unit 310 in the second switch unit S2 detects the short circuit first. The switch 340 in the second switch unit S2 is immediately switched off by the control switch 320 and the isolation driving unit 330 in the second switch unit S2.

Further, the short circuit detection unit 310 in the second switch unit S2 sends a fault signal to the MCU. When receiving the fault signal, the MCU sends a collective turning off signal. The switch 340 in each switch unit is switched off by the control switch 320 and the isolation driving unit 330 in the switch unit.

It should be noted that after the switch 340 in the second switch unit S2 is switched off, the switch 340 in the first switch unit S1 and the switch 340 in the fourth switch unit S4 are still short-circuited. If the short circuit detection unit 310 in the first switch unit S1 detects the short circuit before the turning off signal sent by the MCU arrives, the control switch 320 in the first switch unit S1 is immediately switched off, and then the switch 340 in the first switch unit S1 is switched off. After the second switch unit S2 and the first switch unit S1 are switched off the short circuit is removed. Therefore, the third switch unit S3 and the fourth switch unit S4 each do not generate a fault signal, and are switched off by the collective turning off signal sent by the MCU.

It takes a certain time period for the MCU to make a logical determination on the fault signal. Therefore, the control switch 320 in the switch unit that detects the fault receives the fault signal from the short circuit detection unit 310 in the same switch unit as the control switch 320 before the driving signal for disabling from the MCU. In this case, if the switch 340 in the switch unit that detects the fault is off, the switch 340 remains off without being switched off.

Figure 4:
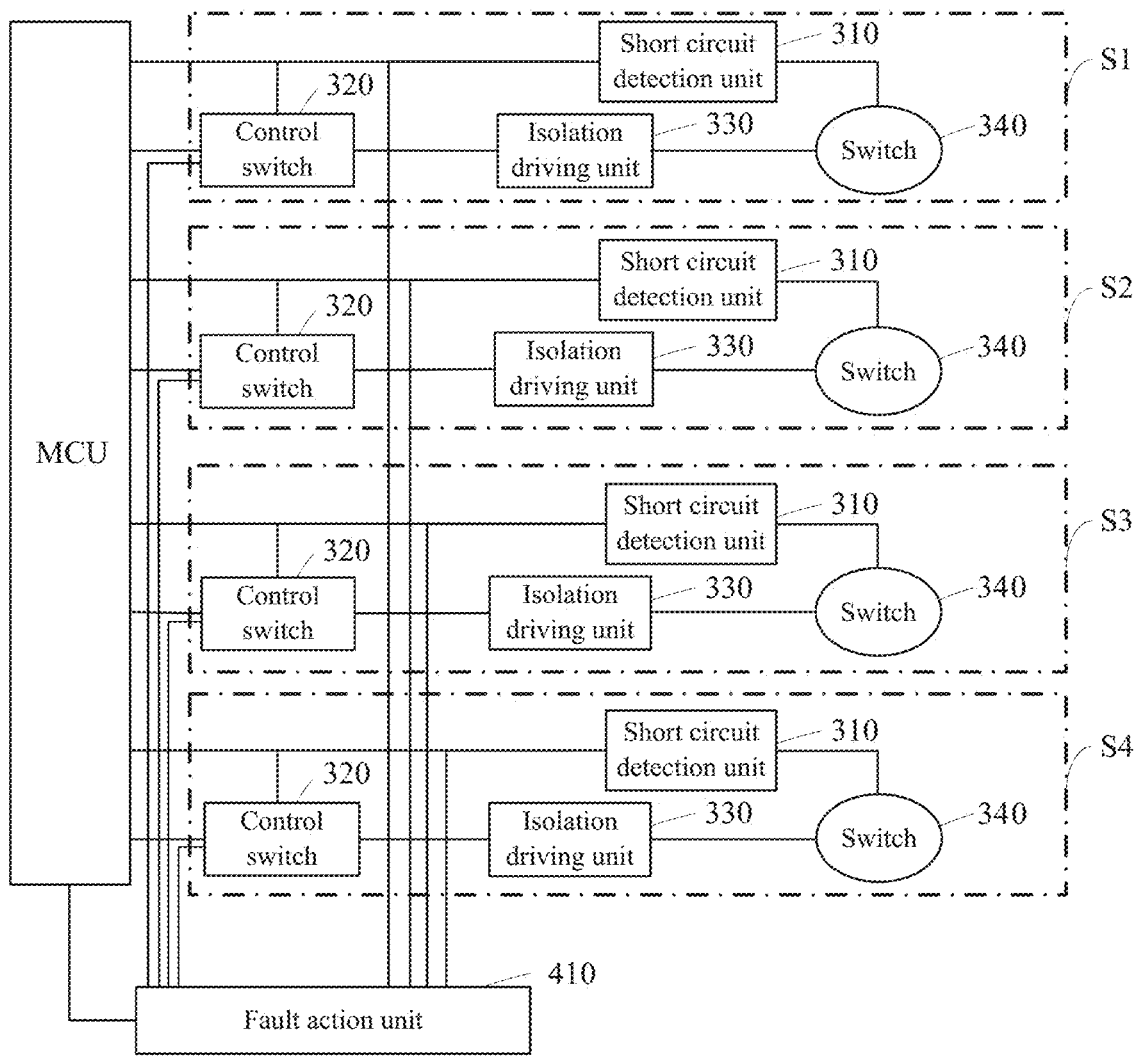
FIG. 4 is a schematic diagram of a fault action unit in a NPC three-level topology with a flying capacitor according to an embodiment of the present disclosure.

In an embodiment, based on the above embodiment as shown in FIG. 3, the NPC three-level topology with the flying capacitor further includes a fault action unit 410, as shown in FIG. 4.

The short circuit detection unit 310 is further configured to send, when detecting that the switch 340 is short-circuited, the fault signal to the fault action unit 410. The fault action unit 410 outputs a driving signal for disabling to the control switch 320 in each switch unit, so that the switch 340 in the switch unit is switched off by the isolation driving unit 330 in the switch unit.

That is, when detecting that the switch 340 is short-circuited, the short circuit detection unit 310 sends the fault signal to the fault action unit 410 and the control switch 320 in the same switch unit as the short circuit detection unit 310.

When detecting that the switch 340 is faulty, the short circuit detection unit 310 generates a fault signal and sends the fault signal to the control switch 320 in the same switch unit as the short circuit detection unit 310 and the fault action unit 410. When receiving the fault signal, the control switch 320 controls the switch 340 in the same switch unit as the control switch 320 to switch off.

When receiving the fault signal sent by the short circuit detection unit 310 the fault action unit 410 sends a driving signal for disabling to the control switch 320 in each switch unit. The control switch 320 outputs a driving signal for disabling to the isolation driving unit 330 in the same switch unit as the control switch 320, and the isolation driving unit 330 switches off the switch 340 in the same switch unit as the isolation driving unit 330.

The fault action unit 410 controls each switch unit by hardware control, spending a short time period. In general, the control switch 320 in a switch unit that is currently fault receives the fault signal sent by the short circuit detection unit 310 in the switch unit before the driving signal for disabling sent by the fault action unit 410. In this case, if the switch 340 in the switch unit that is currently fault is off, the switch 340 remains off without being switched off.

Alternatively, the control switch 320 in a switch unit that is currently fault receives the fault signal sent by the short circuit detection unit 310 in the switch unit after the driving signal for disabling sent by the fault action unit 410. In this case, if the switch 340 in the switch unit that is currently faulty is off, the switch 340 remains off without being switched off.

In this embodiment, a time period of hardware control is shorter than a time period of software control. Therefore, a time period required to control each switch 340 to switch off by the fault action unit 410 is relatively short. Correspondingly, a time period from a time instant when a short circuit is detected to a time instant when each switch 340 is switched off is relatively short, so as to reduce the possibility of damage to the switch 340 due to overvoltage, thereby ensuring safe operation of the NPC three-level topology with the flying capacitor.

In addition, in this embodiment, all the short circuit detection units 310 are not connected to the MCU. Instead, the fault action unit 410 sends the fault signal to the MCU. When receiving the fault signal sent by the short circuit detection unit 310 that first detects the short circuit, the fault action unit 410 sends the fault signal to the MCU, so that the MCU performs other operations such as alarming. Alternatively, all the short circuit detection units 310 are connected to the MCU, for backup protection.

It should be noted that, in any one of the embodiments shown in FIGS. 2 to 4, a voltage across the flying capacitor Css is equal to 0 in a case that the NPC three-level topology with the flying capacitor does not operate for a long time period. In this case, if the NPC three-level topology with the flying capacitor is started directly, an impulse current generated by the NPC three-level topology with the flying capacitor may cause overcurrent damage to components such as the flying capacitor Css or the switch unit.

Figure 5:
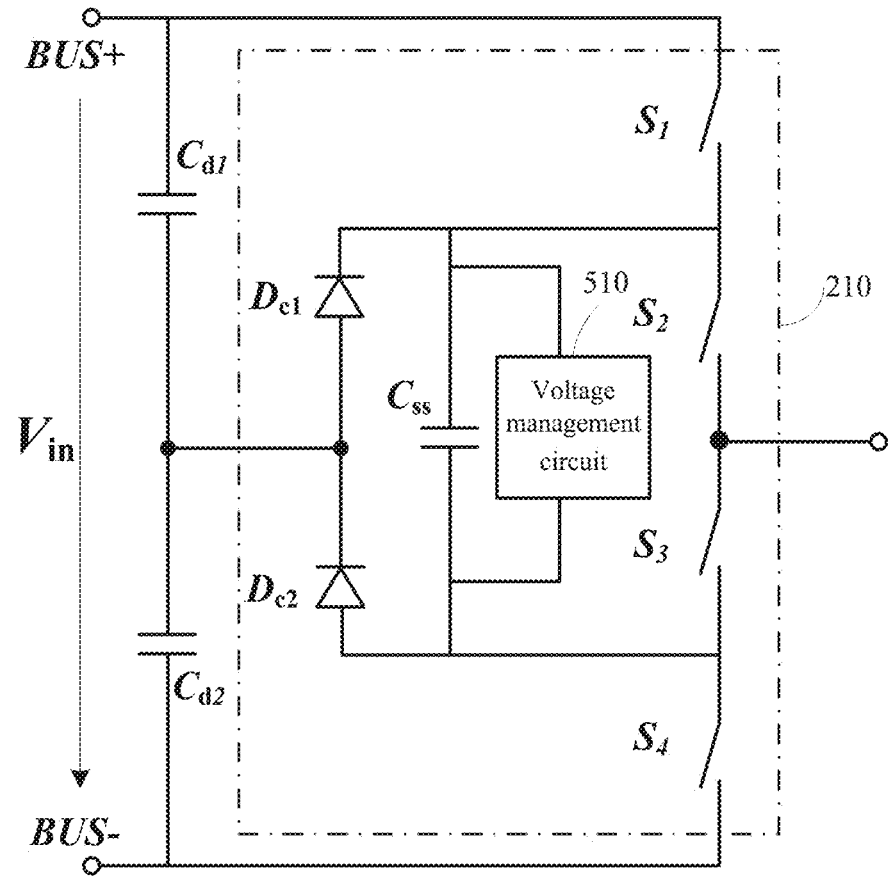
FIG. 5 is a schematic diagram of a voltage management circuit in a NPC three-level topology with a flying capacitor according to an embodiment of the present disclosure.

Therefore, based on the embodiments shown in FIGS. 2 to 4, the NPC three-level topology with the flying capacitor further includes a voltage management circuit 510 according to another embodiment of the present disclosure, as shown in FIG. 5 (for example, based on FIG. 2).

The voltage management circuit 510 is configured to charge the flying capacitor Css after the NPC three-level topology with the flying capacitor is powered on.

After the NPC three-level topology with the flying capacitor is powered on, the voltage management circuit 510 controls the positive electrode or the negative electrode of the direct current side to charge the flying capacitor Css. In this case, the bridge arm 210 in the NPC three-level topology with the flying capacitor does not operate, that is, all the switch units in the bridge arm 210 are off until the voltage across the flying capacitor Css is in a preset range or duration for charging the flying capacitor Css is greater than or equal to a preset time period. In this case, the bridge arm 210 in the NPC three-level topology with the flying capacitor is in a starting operation state, each of the switch units in the bridge arm 210 is switched on or off according to a switching logic corresponding to the operation state.

In this embodiment, the voltage management circuit 510 controls the positive electrode or the negative electrode of the direct current side to charge the flying capacitor Css. Therefore, when the NPC three-level topology with the flying capacitor is started, the voltage across the flying capacitor Css is greater than 0, thereby reducing the damage to the flying capacitor by an impulse current.

Figure 6:
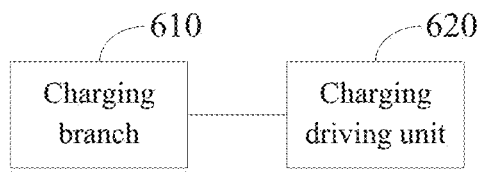
FIG. 6 is a schematic diagram of a voltage management circuit in a NPC three-level topology with a flying capacitor according to another embodiment of the present disclosure.

In an embodiment, the voltage management circuit 510 in the above embodiment of the present disclosure as shown in FIG. 5 includes a charging branch 610 and a charging driving unit 620, as shown in FIG. 6.

The charging driving unit 620 is configured to control the charging branch 610 to charge the flying capacitor Css in a case that the MCU of the NPC three-level topology with the flying capacitor meets a preset condition. One terminal of the charging branch 610 is connected to the flying capacitor Css. The other terminal of the charging branch 610 is connected to the positive electrode or the negative electrode of the direct current side of the NPC three-level topology with the flying capacitor.

In a case that the MCU of the NPC three-level topology with the flying capacitor meets the preset condition, the charging driving unit 620 controls the charging branch 610 to switch on, that is, connects the flying capacitor Css to the positive electrode or the negative electrode of the direct current side via the charging branch 610, so that the positive electrode or the negative electrode of the direct current side charges the flying capacitor Css.

In a case that the MCU of the NPC three-level topology with the flying capacitor does not meet the preset condition, the charging driving unit 620 controls the charging branch 610 to be cut off, that is, disconnects the flying capacitor Css from the positive electrode or the negative electrode of the direct current side. In this case, the positive electrode or the negative electrode of the direct current side stops charging the flying capacitor Css.

Figure 7A:
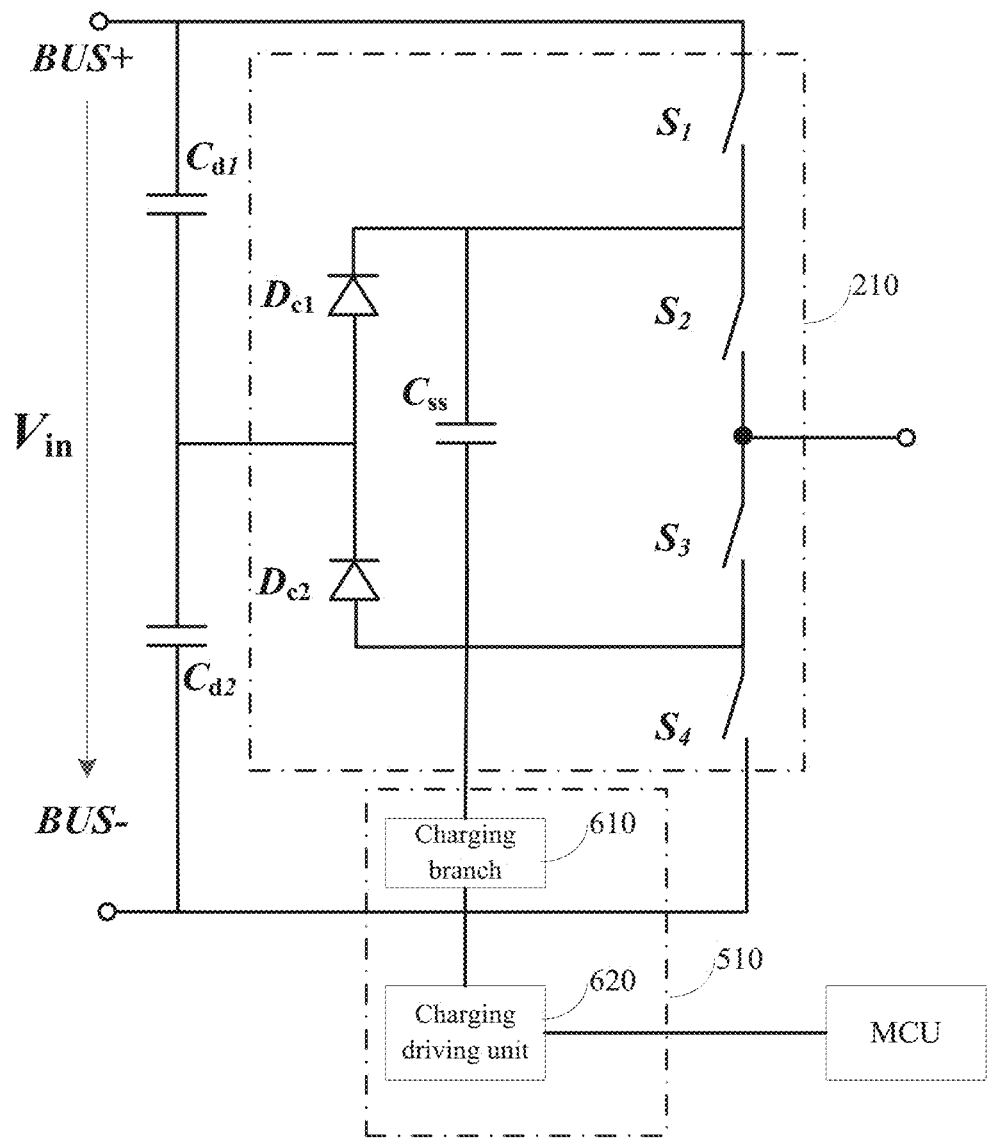
FIG. 7a is a schematic diagram of a voltage management circuit in a NPC three-level topology with a flying capacitor according to another embodiment of the present disclosure.

Reference is made to FIG. 7a, which shows a NPC three-level topology a the flying capacitor in which a charging branch 610 is connected between the flying capacitor Css and the negative electrode of the direct current side. In a case that the MCU of the NPC three-level topology with the flying capacitor meets the preset condition, the charging driving unit 620 controls the charging branch 610 to switch on, that is, connects the flying capacitor Css to the negative electrode of the direct current side via the charging branch 610, so that the negative electrode of the direct current side charges the flying capacitor Css.

Figure 7B:
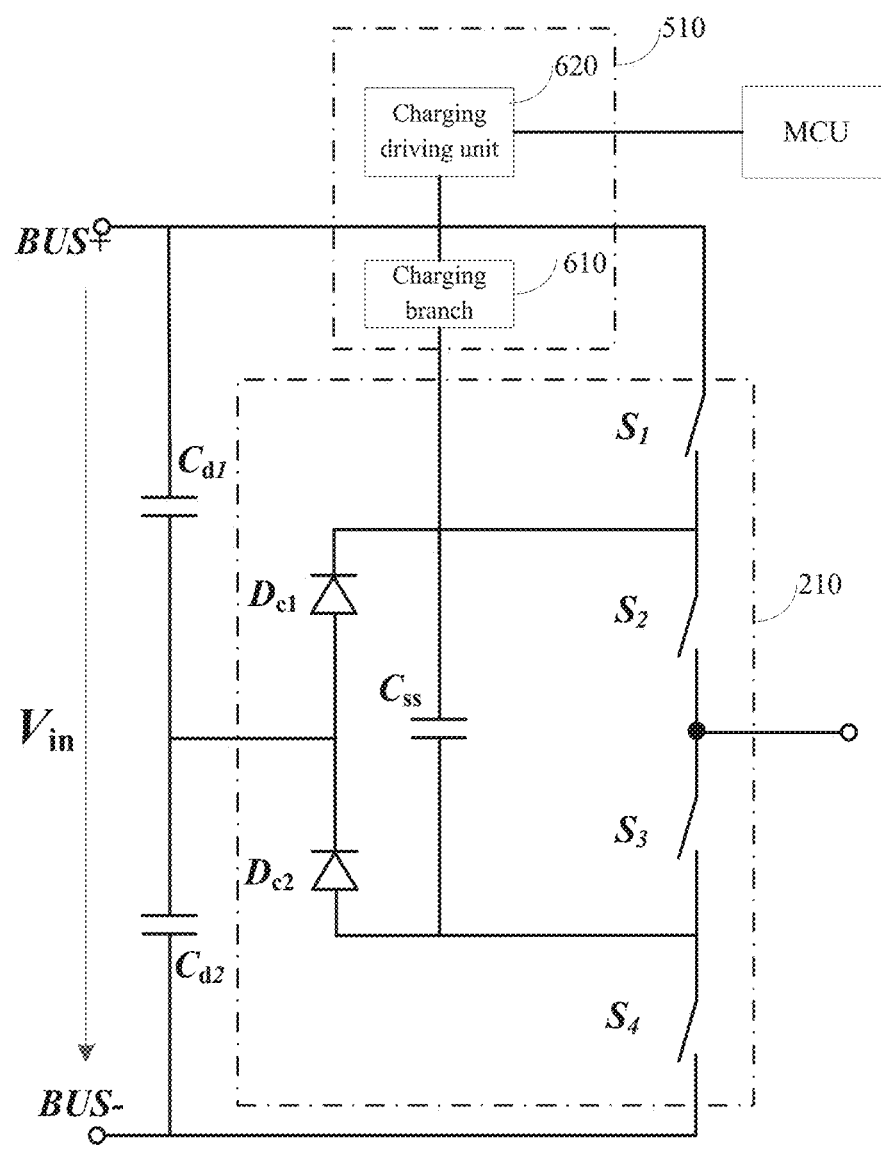
FIG. 7b is a schematic diagram of a voltage management circuit in a NPC three-level topology with a flying capacitor according to another embodiment of the present disclosure.

Reference is made to FIG. 7b, which shows a NPC three-level topology with a flying capacitor in which a charging branch 610 is connected between the flying capacitor Css and the positive electrode of the direct current side. In a case that the MCU of the NPC three-level topology with the flying capacitor meets the preset condition, the charging driving unit 620 controls the charging branch 610 to switch on, that is, connects the flying capacitor Css to the positive electrode of the direct current side via the charging branch 610, so that the positive electrode of the direct current side charges the flying capacitor Css.

In addition, in this embodiment, the voltage management circuit 510 further includes a discharging branch. The charging driving unit 620 is further configured to control the discharging branch to discharge the flying capacitor. The discharging branch is connected in parallel with the flying capacitor Css.

In a case that the MCU of the NPC three-level topology with the flying capacitor meets the preset condition, the charging driving unit 620 controls the charging branch 610 to charge the flying capacitor Css, and controls the discharging branch to stop discharging the flying capacitor Css. In a case that the MCU of the NPC three-level topology with the flying capacitor does not meet the preset condition, the charging driving unit 620 controls the charging branch 610 to stop charging the flying capacitor Css, and controls the discharging branch to discharge the flying capacitor Css.

In actual operation, the preset condition in the above embodiment of the present disclosure shown in FIG. 6 is that a present time instant is within a preset time period since a time instant when the NPC three-level topology with the flying capacitor is powered on. The preset time period is greater than three times a time constant of the charging branch.

In the preset time period since the time instant when the NPC three-level topology with the flying capacitor is powered on, the charging driving unit 620 controls the charging branch 610 to charge the flying capacitor Css. At a time instant when the NPC three-level topology with the flying capacitor is powered on, the MCU sends a driving signal for enabling to the charging driving unit 620. Alternatively, in the preset time period since the time instant when the NPC three-level topology with the flying capacitor is powered on, the MCU sends the driving signal for enabling to the charging driving unit 620 at preset intervals.

When the preset time period since the time instant when the NPC three-level topology with the flying capacitor is powered on is past, the charging driving unit 620 controls the charging branch 610 to stop charging the flying capacitor Css. At a time instant when the preset time period after the NPC three-level topology with the flying capacitor is powered on is past the MCU sends a driving signal for disabling to the charging driving unit 620.

In this embodiment, the preset time period is greater than three times the time constant of the charging branch, to ensure that the voltage across the flying capacitor Css reaches a preset voltage, and to further prevent the flying capacitor Css from being broken down due to the impulse current, thereby reducing the damage to the flying capacitor Css due to the impulse current.

Figure 8:
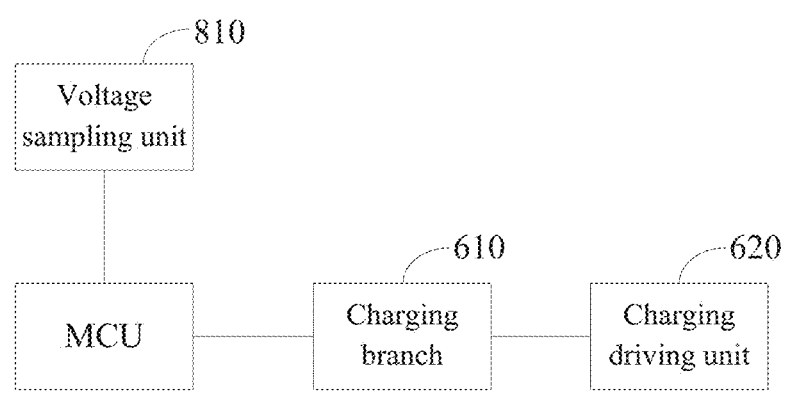
FIG. 8 is a schematic diagram of a sampling unit in a NPC three-level topology with a flying capacitor according to an embodiment of the present disclosure.

In an embodiment, the voltage management circuit 510 in the above embodiment of the present disclosure shown in FIG. 7 further includes a sampling unit 810, as shown in FIG. 8.

The sampling unit 810 is configured to sample the voltage across the flying capacitor Css, and send the sampled voltage across the flying capacitor Css to the MCU.

Therefore, in this embodiment, the above preset condition is that the voltage across the flying capacitor Css is not within an interval of $[(1-k)V_{in}/2, (1+k)V_{in}/2]$, or the voltage across the flying capacitor Css is less than or equal to $(1-k)V_{in}/2$. $V_{in}$ represents the input voltage of the direct current side of the NPC three-level topology with the flying capacitor, and k represents a startup factor of the voltage across the flying capacitor. Where k may range from 0 to 5%, or, k is equal to 10%.

The sampling unit 810 samples the voltage across the flying capacitor Css, and sends the sampled voltage across the flying capacitor Css to the MCU. When determining that the voltage across the flying capacitor Css is not within the interval of $[(1-k)V_{in}/2, (1+k)V_{in}/2]$, the MCU sends a driving signal for enabling to the charging driving unit 620. The charging driving unit 620 controls the charging branch 610 to charge the flying capacitor Css. Alternatively, when determining that the voltage across the flying capacitor Css is less than or equal to $(1-k)V_{in}/2$, the MCU sends a driving signal for enabling to the charging driving unit 620. The charging driving unit 620 controls the charging branch 610 to charge the flying capacitor Css.

When determining that the voltage across the flying capacitor Css is within the interval of [(1−k)Vin/2, (1+k)Vin/2], the MCU sends a driving signal for disabling to the charging driving unit 620. The charging driving unit 620 controls the charging branch 610 to stop charging the flying capacitor Css. Alternatively, when determining that the voltage across the flying capacitor Css is greater than (1−k)Vin/2, the MCU sends a driving signal for disabling to the charging driving unit 620. The charging driving unit 620 controls the charging branch 610 to stop charging the flying capacitor Css.

It should be noted that the NPC three-level topology with the flying capacitor may include multiple flying capacitors Css. In this case, when a voltage across any flying capacitor Css meets the preset condition, the charging driving unit 620 controls the charging branch 610 to charge the flying capacitor Css.

Figure 9:
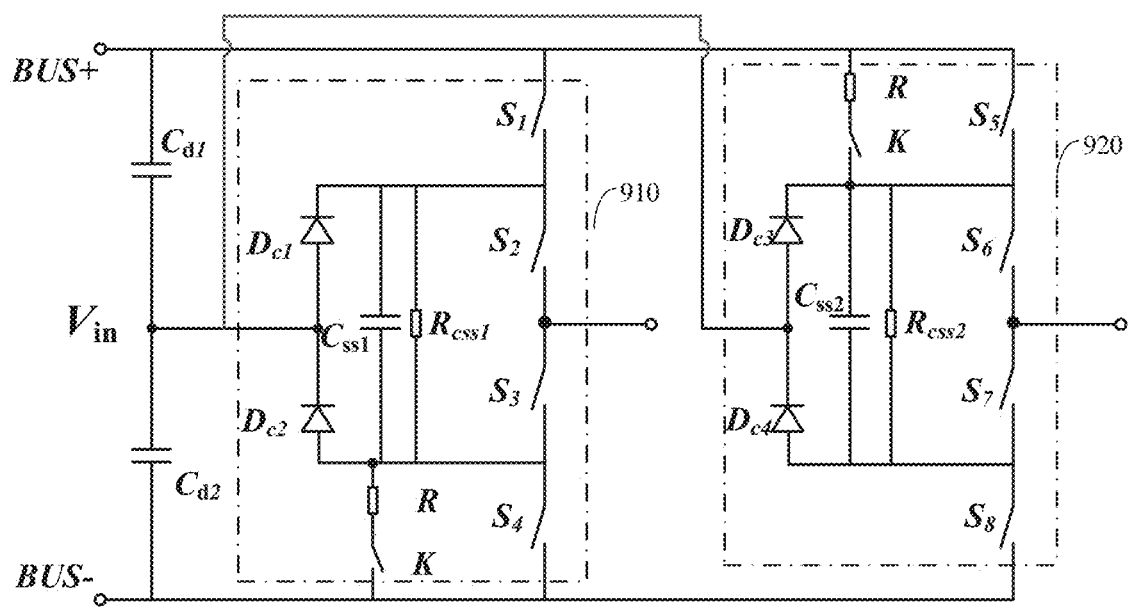
FIG. 9 is a schematic diagram of a NPC three-level topology with a flying capacitor according to another embodiment of the present disclosure.

In addition, the charging branch 610 in the embodiments of the present disclosure shown in FIGS. 6 and 7 includes a resistor R and a controllable switch K, as shown in FIG. 9. The resistor R is connected in series to the controllable switch K.

In practice, the number of bridge arms in the NPC three-level topology with the flying capacitor may be an even number. In each of half out of the bridge arms, the charging branch 610 is arranged between the positive electrode of the direct current side of the NPC three-level topology with the flying capacitor and the flying capacitor Css in the bridge arm. In each of the other half out of the bridge arms, the charging branch 610 is arranged between the negative electrode of the direct current side of the NPC three-level topology with the flying capacitor and the flying capacitor Css in the bridge arm.

Alternatively, in each of all the bridge arms, the charging branch 610 is arranged between the negative electrode of the direct current side of the NPC three-level topology with the flying capacitor and the flying capacitor Css in the bridge arm, or the charging branch 610 is arranged between the positive electrode of the direct current side of the NPC three-level topology with the flying capacitor and the flying capacitor Css in the bridge arm.

This embodiment is illustrated below with an example in which the charging branch 610 in each of half out of the bridge arms is arranged between the negative electrode of the direct current side of the NPC three-level topology with the flying capacitor and the flying capacitor Css in the bridge arm, and the charging branch 610 in each of the other half out of the bridge arms is arranged between the positive electrode of the direct current side of the NPC three-level topology with the flying capacitor and the flying capacitor Css in the bridge arm.

In a first bridge arm 910, one terminal of the resistor R is connected to the flying capacitor Css, the other terminal of the resistor R is connected to one terminal of the controllable switch K, and the other terminal of the controllable switch K is connected to the second capacitor Cd2, and a node at which the controllable switch K is connected to the second capacitor Cd2 is configured to be the negative electrode of the direct current side. In a second bridge arm 920, one terminal of the resistor R is connected to the first capacitor Cd1, a node at which the resistor R is connected to the first capacitor Cd1 is configured to be the positive electrode of the direct current side, the other terminal of the resistor R is connected to one terminal of the controllable switch K, and the other terminal of the controllable switch K is connected to the flying capacitor Css.

Here, the number of bridge arms is two as an example for description as follows. The connection where the number of bridge arms is another even number is the same as the connection of two bridge arms, and is not described in detail herein.

In the first bridge arm 910, there are two paths for charging a flying capacitor Css1. One path starts from an input power supply of the direct current side, and sequentially passes through the first capacitor Cd1, a first diode De1 in the first bridge arm 910, the flying capacitor Css1 in the first bridge arm 910, the resistor R in the first bridge arm 910, and the controllable switch K in the first bridge arm 910. The other path sequentially passes through the second capacitor Cd2, the first diode De1 in the first bridge arm 910, the flying capacitor Css1 in the first bridge arm 910, the resistor R in the first bridge arm 910 and the controllable switch K in the bridge arm 910. It can be seen from the two paths that in the process of charging the flying capacitor Css1 in the first bridge arm 910, the first capacitor Cd1 is charged and the second capacitor Cd2 discharges.

Similarly, in the second bridge arm 920, there are two paths for charging the flying capacitor Css2. One path sequentially passes through the first capacitor Cd1, the resistor R in the second bridge arm 920, the controllable switch K in the second bridge arm 920, the flying capacitor Css2 in the second bridge arm 920, and the second diode Dc4 in the second bridge arm 920. The other path starts from the input power supply of the direct current side, and sequentially passes through the resistor R in the second bridge arm 920, the controllable switch K in the second bridge arm 920, the flying capacitor Css2 in the second bridge arm 920, the second diode Dc4 in the second bridge arm 920 and the second capacitor Cd2. It can be seen from the two paths that in the process of charging the flying capacitor Css2 in the second bridge arm 920, the first capacitor Cd1 is charged and the second capacitor Cd2 discharges.

The first capacitor Cd1 is charged and the second capacitor Cd2 discharges to ensure that charging the flying capacitors (that is, Css1 and Css2) does not affect the voltage balance of the first capacitor Cd1 and the second capacitor Cd2.

In addition, in this embodiment, the bridge arms 910 and/or the bridge arm 920 further include a discharging resistor (for example, Rcss1 in the bridge arm 910 and Rcss2 in the bridge arm 920 as shown in FIG. 9). The discharging resistor is connected in parallel with the flying capacitor in the same bridge arm as the discharging resistor. Since the discharging resistor is connected in parallel at both ends of the flying capacitor in the same bridge arm as the discharging resistor, and the fault of short circuit do not occur frequently, it is unnecessary to start the circuit quickly after a fault. The discharging resistor may have large resistance, and the effect on the efficiency of the circuit may be not considered.

Figure 10:
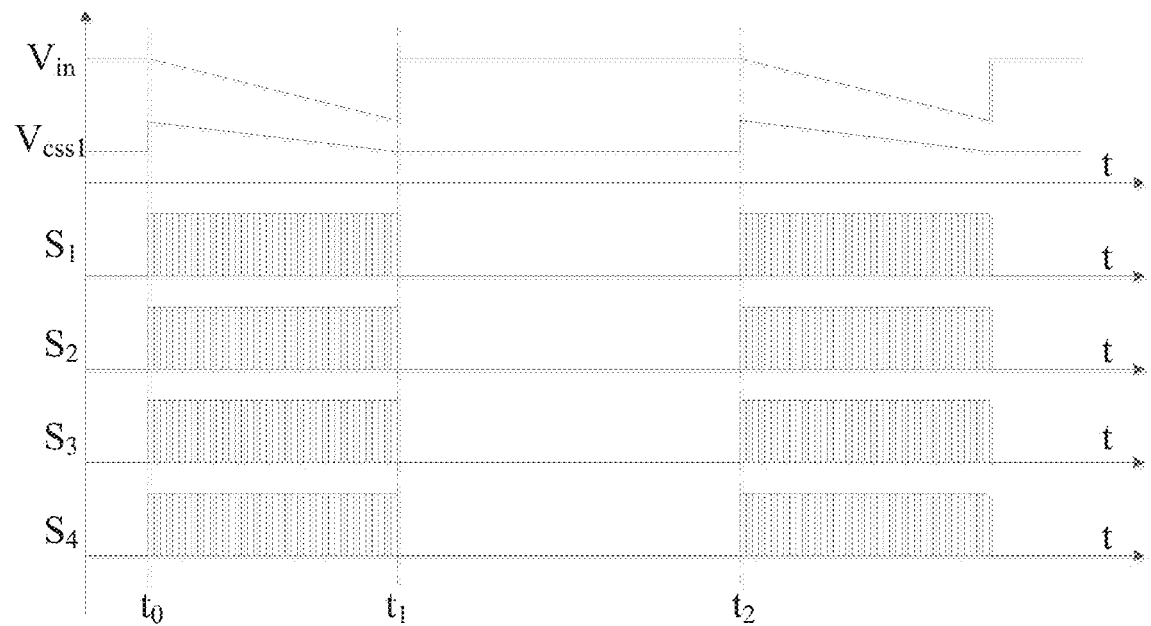
FIG. 10 is a schematic diagram of waveforms of all switch transistor units in a NPC three-level topology in a hiccup mode according to the conventional technology.

It should be noted that, in order to reduce the switching loss, the NPC three-level topology with the flying capacitor generally operates in a hiccup mode at light load. The hiccup mode includes an operation phase and an off phase. Referring to FIG. 10, the operation phase corresponds to a time period from a time instant t0 to a time instant t1, and the off phase corresponds to a time period from the time instant t1 to a time instant t2. In the operation phase, the switch unit operates in a pulse modulation state. In the off phase, all the switch units each are drove based on a low level and thus stop operating.

In a case that a photovoltaic panel is configured to be the input power supply of the direct current side and the NPC three-level topology with the flying capacitor operates in the hiccup mode, the input voltage Yin of the direct current side decreases in the operation phase. At the time instant t1, output power is equal to zero, and the input voltage Yin of the direct current side changes to an open circuit voltage. Then, during the time period from the time instant t1 to the time instant t2, the input voltage Vin of the direct current side remains unchanged.

In the hiccup mode, voltages respectively across all the flying capacitors have the same waveform, as shown in FIG. 9. A voltage Vass1 across the flying capacitor Css1 in the first bridge arm 910 is taken as an example for description as follows.

During the operation phase, the voltage Vcss1 across the flying capacitor Css1 is equal to Vin/2. Therefore, the voltage Vcss1 across the flying capacitor Css1 decreases synchronously with the input voltage Vin of the direct current side. In the off phase, all the switch units are switched off, the flying capacitor Css1 is floating, and thus the voltage Vcss1 across the flying capacitor Css1 has the same value as the time instant t1 and remains unchanged.

At the time instant t0, the voltage Vcss1 across the flying capacitor Css1 is less than Vin/2. In a case that the first switch unit S1 is switched on, the flying capacitor Css1 is charged via the first capacitor Cd1, the first switch unit S1, the flying capacitor Css1, and the second diode Dc2. Alternatively, in a case that the fourth switch unit S4 is switched on, the flying capacitor Css1 is charged via the second capacitor Cd2, the first diode Dc1, the flying capacitor Css1, and the fourth switch unit S4. In a case of a large voltage difference, that is, at the time instant t0, the current has a pulse shape and a large amplitude, resulting in damage to the first diode Dc1, the second diode Dc2, the first switch unit S1, and the fourth switch unit S4. The operation process and principle of the second bridge arm 920 are similar to those of the first bridge arm 910, and thus are not described in detail herein.

In order to solve the above problems, in the NPC three-level topology with the flying capacitor according to any one of the embodiments shown in FIGS. 2 to 9, for example, in FIG. 2, one of the first switch unit S1 and the fourth switch unit S4 is constantly on during the off phase in the hiccup mode. For example, during the off phase in the hiccup mode, the first switch unit S1 is constantly on, or the fourth switch unit S4 is constantly on.

Figure 11:
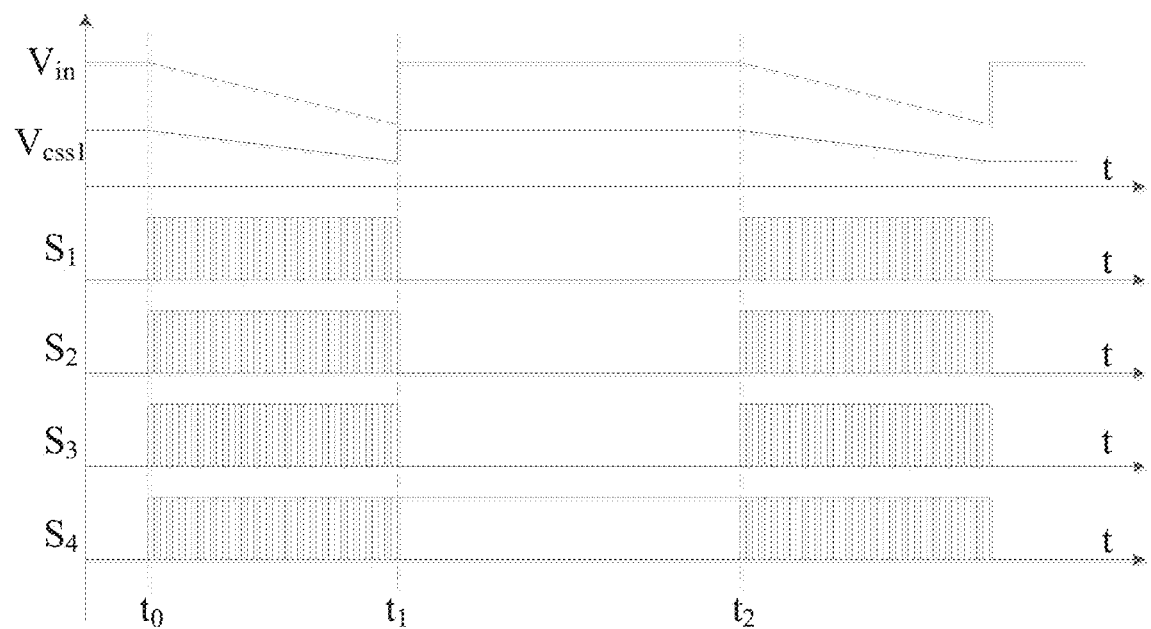
FIG. 11 is a schematic diagram of waveforms of all switch transistor units in a NPC three-level topology with a flying capacitor in a hiccup mode according to an embodiment of the present disclosure.

Referring to FIG. 11, one of the first switch unit S1 and the fourth switch unit S4 being constantly on during the off phase in the hiccup mode is described below.

The fourth switch unit S4 is constantly on. During the time period from the time instant it to the time instant t2, the fourth switch unit S4 is constantly on, so that the flying capacitor Css is connected in parallel to the second capacitor Cd2, and therefore the voltage Vcss across the flying capacitor Css is equal to Vin/2.

Alternatively, the first switch unit S1 is constantly on. During the time period from the time instant t1 to the time instant t2, the first switch unit S1 is constantly on, so that the flying capacitor Css is connected in parallel to the first capacitor Cd1, and therefore the voltage Vcss across the flying capacitor Css is equal to Vin/2.

It should be noted that the flying capacitor Css in the present disclosure has relatively large capacitance which cannot be ignored in a case that the flying capacitor Css is connected in parallel to the first capacitor Cd1 and the second capacitor Cd2. Therefore, in a case that the NPC three-level topology with the flying capacitor includes multiple bridge arms, the flying capacitor Css in each of half out of the multiple bridge arms is connected in parallel to the first capacitor Cd1, and the flying capacitor Css in each of the other half out of the multiple bridge arms is connected in parallel to the second capacitor Cd2, so as to improve voltage division effect of the direct current side.

Description is given with an example in which the NPC three-level topology with the flying capacitor includes two bridge arms, as shown in FIG. 9. During the off phase, the first switch unit S1 in the first bridge arm 910 and the fourth switch unit S4 in the second bridge arm 920 are on. Alternatively, during the off phase, the fourth switch unit S4 in the first bridge arm 910 and the first switch unit S5 in the second bridge arm 920 are on. In addition to the photovoltaic panel, other input source may serve as the input power supply of the direct current side, which are all within the protection scope of the present disclosure.

In this embodiment, the voltage difference is small, and thus the current has a small amplitude, thereby ensuring the safety of the first diode Dc1, the second diode Dc2, the first switch unit S1, and the fourth switch unit S4.

The embodiments in this specification are described in a progressive manner. The same or similar parts between embodiments can be referred to each other, and each embodiment focuses on differences from other embodiments. Since the system or system embodiment is similar to the method embodiment, the description of the system is relatively simple, and for related parts, reference can be made to the description of the method embodiment. The system and system embodiment described above are merely illustrative. The units described as separate components may or may not be physically separate from each other. A component described as a unit may or may not be a physical unit, that is, may be located at one place or may be distributed on multiple network units. Some or all of the modules may be selected to implement the technical solutions in the embodiments, depending on actual needs. Those skilled in the art can understand and implement the technical solutions without creative work.

Those skilled in the art should further understand that the units and algorithm steps described is examples in combination with the embodiments according to the present disclosure can be implemented by electronic hardware, computer software, or a combination of electronic hardware and computer software. In order to clearly illustrate the interchangeability of hardware and software, details and steps in each example are described in terms of functions in the above description. Whether these functions are implemented by hardware or software depends on actual applications of the technical solutions and design constraints. Those skilled in the art may implement the described functions in a way varying to with actual applications, all of which should fall within the scope of the present disclosure.

Based on the above description of the disclosed embodiments, those skilled in the art can implement or use the present disclosure. Those skilled in the art can easily think of various modifications to the disclosed embodiments, and the general principles defined herein may be implemented in other embodiments without departing from the spirit or scope of the present disclosure. Therefore, the present disclosure should not be limited to the described embodiments, but conforms to the widest scope that complies with the principles and novelty disclosed herein.

The invention claimed is:

1. An NPC three-level topology with a flying capacitor, comprising: two half-bus capacitors and at least one bridge arm, wherein
the at least one bridge arm comprises the flying capacitor, two inner switch units, two outer switch units, and two clamping diodes;
a capacitance value of the flying capacitor is greater than or equal to a preset value, so that a voltage change across the flying capacitor does not cause overvoltage of a switch of the inner switch units and the outer switch units when a short circuit fault occurs;
the two half-bus capacitors are identical; and
the two clamping diodes are identical;
wherein the preset value is a capacitance value of the flying capacitor during a short circuit interval, which ensures that a voltage of a switch in a switch unit is less than a breakdown voltage of said switch.

2. The NPC three-level topology with the flying capacitor according to claim 1, wherein one of the two outer switch units is constantly on during an off phase in a hiccup mode.

3. The NPC three-level topology with the flying capacitor according to claim 1, wherein
the two half-bus capacitors are connected in series, the two clamping diodes are connected in series, and a connection point of the two clamping diodes is connected to a connection point of the two half-bus capacitors;
one terminal of the two half-bus capacitors that are connected in series is configured to be a positive electrode of a direct current side of the NPC three-level topology with the flying capacitor, and is connected to one terminal of one of the two inner switch units, one terminal of the flying capacitor, and a cathode of the two clamping diodes that are connected in series via one of the two outer switch units in the bridge arm;
the other terminal of the two half-bus capacitors that are connected in series is configured to be a negative electrode of the direct current side of the NPC three-level topology with the flying capacitor, and is connected to one terminal of the other of the two inner switch units, the other terminal of the flying capacitor, and an anode of the two clamping diodes that are connected in series via the other of the two outer switch units in the bridge arm; and
a connection point of the two inner switch units is configured to be a port of an alternating current side of the NPC three-level topology with the flying capacitor.

4. The NPC three-level topology with the flying capacitor according to claim 3, wherein one of the two outer switch units is constantly on during an off phase in a hiccup mode.

5. The NPC three-level topology with the flying capacitor according to claim 1, wherein the preset value is calculated from an expression:

$$Isc*Tsc/(Kprt*V(BR)DSS-Vin\_max/2);$$

wherein Isc represents an average short circuit current during the short circuit interval of the switch in the switch unit, the average short circuit is an average value of a current flowing through said switch during the short circuit interval, Tsc represents duration time of the short circuit, V(BR)DSS represents the breakdown voltage of said switch, Vin_max represents a maximum input voltage, and Kprt represents an insurance coefficient.

6. The NPC three-level topology with the flying capacitor according to claim 5, wherein one of the two outer switch units is constantly on during an off phase in a hiccup mode.

7. The NPC three-level topology with the flying capacitor according to claim 1, wherein the two inner switch units and the two outer switch units each comprise a short circuit detection unit, a control switch, an isolation driving unit, and a switch, wherein for each of the two inner switch units and the two outer switch units,
the short circuit detection unit is configured to generate, when the switch is detected to be short-circuited, a fault signal and send the fault signal to the control switch;
the control switch is configured to: control the switch to switch off when receiving the fault signal sent by the short circuit detection unit; and output a corresponding driving signal to the isolation driving unit when receiving a driving signal for disabling or enabling from a micro-control unit (MCU) of the NPC three-level topology with the flying capacitor; and
the isolation driving unit is configured to control, in response to the corresponding driving signal, the switch to switch off or on.

8. The NPC three-level topology with the flying capacitor according to claim 7, wherein one of the two outer switch units is constantly on during an off phase in a hiccup mode.

9. The NPC three-level topology with the flying capacitor according to claim 7, wherein the short circuit detection unit is further configured to send, when the switch is detected to be short-circuited, the fault signal to the MCU, wherein the MCU is configured to output a driving signal for disabling to each control switch, to switch off the switch corresponding to the control switch via the isolation driving unit corresponding to the control switch.

10. The NPC three-level topology with the flying capacitor according to claim 9, wherein one of the two outer switch units is constantly on during an off phase in a hiccup mode.

11. The NPC three-level topology with the flying capacitor according to claim 7, further comprising: a fault action unit;
wherein the short circuit detection unit is further configured to send, when the switch is detected to be short-circuited, the fault signal to the fault action unit, wherein the fault action unit is configured to output a driving signal for disabling to each control switch, to switch off the switch corresponding to the control switch via the isolation driving unit corresponding to the control switch.

12. The NPC three-level topology with the flying capacitor according to claim 11, wherein one of the two outer switch units is constantly on during an off phase in a hiccup mode.

13. The NPC three-level topology with the flying capacitor according to claim 11, wherein the fault action unit is further configured to send the fault signal to the MCU.

14. The NPC three-level topology with the flying capacitor according to claim 13, wherein one of the two outer switch units is constantly on during an off phase in a hiccup mode.

15. The NPC three-level topology with the flying capacitor according to claim 1, further comprising a voltage management circuit;
wherein the voltage management circuit is configured to charge the flying capacitor after the NPC three-level topology with the flying capacitor is powered on.

16. The NPC three-level topology with the flying capacitor according to claim 15, wherein the voltage management circuit comprises a charging branch and a charging driving unit;
   wherein the charging driving unit is configured to control, in a case that a MCU of the NPC three-level topology with the flying capacitor meets a preset condition, the charging branch to charge the flying capacitor; and
   wherein one terminal of the charging branch is connected to the flying capacitor, and the other terminal of the charging branch is connected to a positive electrode or a negative electrode of a direct current side of the NPC three-level topology with the flying capacitor.

17. The NPC three-level topology with the flying capacitor according to claim 16, wherein the preset condition is that a present time instant is within a preset time period since a time instant when the NPC three-level topology with the flying capacitor is powered on, wherein the preset time period is greater than three times a time constant of the charging branch.

18. The NPC three-level topology with the flying capacitor according to claim 16, wherein the voltage management circuit further comprises a sampling unit;
   wherein the sampling unit is configured to sample a voltage across the flying capacitor, and send the sampled voltage across the flying capacitor to the MCU; and
   wherein the preset condition is that: the voltage across the flying capacitor Css is not within an interval of, or the voltage across the flying capacitor Css is less than or equal to (1−k) Vin/2, wherein Vin represents an input voltage of the direct current side of the NPC three-level topology with the flying capacitor, and k represents a startup factor of the voltage across the flying capacitor.

19. The NPC three-level topology with the flying capacitor according to claim 16, wherein the charging branch comprises a resistor and a controllable switch;
   wherein the resistor is connected in series to the controllable switch; and
   wherein a control terminal of the controllable switch is connected to an output terminal of the charging driving unit.

20. The NPC three-level topology with the flying capacitor according to claim 16, wherein in a case that the number of the at least one bridge arm in the NPC three-level topology with the flying capacitor is an even number,
   in each of half out of the at least one bridge arm, the charging branch is arranged between the positive electrode of the direct current side of the NPC three-level topology with the flying capacitor and a flying capacitor in the bridge arm; and
   in each of the other half out of the at least one bridge arm, the charging branch is arranged between the negative electrode of the direct current side of the NPC three-level topology with the flying capacitor and a flying capacitor in the bridge arm.

\* \* \* \* \*